US010771113B2

(12) United States Patent
Konanur et al.

(10) Patent No.: US 10,771,113 B2
(45) Date of Patent: Sep. 8, 2020

(54) METHOD AND APPARATUS FOR PTU DETECTION OF NFC DEVICES

(71) Applicant: Intel Corporation, Santa Clara, CA (US)

(72) Inventors: Anand S. Konanur, San Jose, CA (US); Steven G. Gaskill, Corvallis, OR (US); Songnan Yang, San Jose, CA (US); Zhen Yao, San Jose, CA (US); Yujuan Zhao, Belmont, CA (US)

(73) Assignee: Intel Corporation, Santa Clara, CA (US)

( * ) Notice: Subject to any disclaimer, the term of this patent is extended or adjusted under 35 U.S.C. 154(b) by 298 days.

(21) Appl. No.: 15/089,125

(22) Filed: Apr. 1, 2016

(65) Prior Publication Data
US 2017/0288461 A1 Oct. 5, 2017

(51) Int. Cl.
H04B 5/00 (2006.01)
(52) U.S. Cl.
CPC .................. H04B 5/0037 (2013.01)
(58) Field of Classification Search
CPC .............. H04B 5/00; H02J 50/12; H02J 5/005
USPC ........................................................ 307/107
See application file for complete search history.

(56) References Cited

U.S. PATENT DOCUMENTS

| 8,971,802 | B2* | 3/2015 | Jones | H04B 5/0056 455/41.1 |
| 9,094,055 | B2* | 7/2015 | Low | H04B 5/0037 |
| 9,837,990 | B1* | 12/2017 | Pagnanelli | H03M 3/414 |
| 2011/0098867 | A1* | 4/2011 | Jonsson | G01D 4/002 700/295 |
| 2015/0061578 | A1 | 3/2015 | Keeling et al. | |
| 2015/0072615 | A1* | 3/2015 | Mofidi | H04B 5/0075 455/41.1 |

(Continued)

FOREIGN PATENT DOCUMENTS

| CN | 108702179 A | 10/2018 |
| DE | 112017001712 T5 | 12/2018 |

(Continued)

OTHER PUBLICATIONS

"International Application Serial No. PCT/US2017/020110, International Preliminary Report on Patentability dated Oct. 11, 2018", 7 pgs.

(Continued)

Primary Examiner — Rexford N Barnie
Assistant Examiner — Swarna N Chowdhuri
(74) Attorney, Agent, or Firm — Schwegman Lundberg & Woessner, P.A.

(57) ABSTRACT

Embodiments related to systems, methods, and computer-readable media to enable a power transmit unit (PTU) device are described. In one embodiment a PTU comprises a transmit coil configured for wireless charging via magnetic coupling, a power delivery system coupled to the transmit coil, signal processing circuitry to detect harmonic distortion that is induced in the transmit coil by a device inside the near field of the transmit coil, and control circuitry configured to adjust an output power of the power amplifier when triggered by a detection of an Near Field Communications (NFC) device, a Radio Frequency Identification Device (RFID), or any other such device which may be damaged by the energy emitted from the transmit coil.

26 Claims, 10 Drawing Sheets

(56) References Cited

U.S. PATENT DOCUMENTS

2015/0171657 A1    6/2015  Wheeland et al.
2015/0303742 A1   10/2015  Matsumoto et al.
2017/0064562 A1*   3/2017  Jacobson .............. H04W 48/16

FOREIGN PATENT DOCUMENTS

| JP | 2005260878 A | 9/2005 |
| JP | 2014060916 A | 4/2014 |
| WO | WO-2017172197 | 10/2017 |

OTHER PUBLICATIONS

"International Application Serial No. PCT/US2017/020110, International Search Report dated Jun. 8, 2017", 4 pgs.

"International Application Serial No. PCT/US2017/020110, Written Opinion dated Jun. 8, 2017", 5 pgs.

\* cited by examiner

METHOD AND APPARATUS FOR PTU DETECTION OF NFC DEVICES

TECHNICAL FIELD

Embodiments pertain to systems, methods, and component devices for Near Field Communications (NFC), Radio Frequency Identification Devices (RFID), wireless charging systems, Bluetooth communications and devices, and particularly to devices, instructions, and operations for managing those devices and specifically the coexistence of those devices. Some embodiments relate to wireless power transfer and the alliance for wireless power (A4WP).

BACKGROUND

Near field communication devices are becoming more prolific in many consumer products such as smart phones and tablets. They are short range communication devices usually operating in the near field of the electromagnetic field pattern of an antenna. Wireless charging of mobile devices is also becoming increasingly popular for the ease of charging without cables. Since both Near Field Communications (NFC) devices and wireless chargers operate within a limited range, specifically within the near field of the antenna pattern, and since they operate within similar devices, they are designed to be able to coexist without interfering with or causing damage to each other. Near field electromagnetic energy is differentiated from far field electromagnetic radiation by the rate of dissipation over distance. Far field radiation dissipates proportionally to the inverse square of the range while near field electromagnetic energy dissipates much more quickly. Consequently, near field communications are structured to operate within a more limited range. Another difference is that with far field radiation, the ratio of electric field to magnetic field is constant and equal to the wave impedance. However, inside the near field, the ratio of electric and magnetic fields is not constant, and often the magnetic field or the electric field will dominate the flow of energy transfer. Lastly, objects in the far field that absorb radiated energy do not load the transmitter. However, if an object absorbs energy in the near field, it will be "seen" by the transmitter as variation in the antenna load impedance.

DETAILED DESCRIPTION

Embodiments pertain to systems, methods, and component devices for Near Field Communications (NFC), Radio Frequency Identification Devices (RFID), wireless charging systems, Bluetooth communications and devices, and particularly to devices, instructions, and operations for managing those devices and specifically the coexistence of those devices. The following description and the drawings illustrate specific embodiments to enable those skilled in the art to practice them. Other embodiments can incorporate structural, logical, electrical, process, and other changes. Portions and features of some embodiments can be included in, or substituted for, those of other embodiments.

Figure 1:
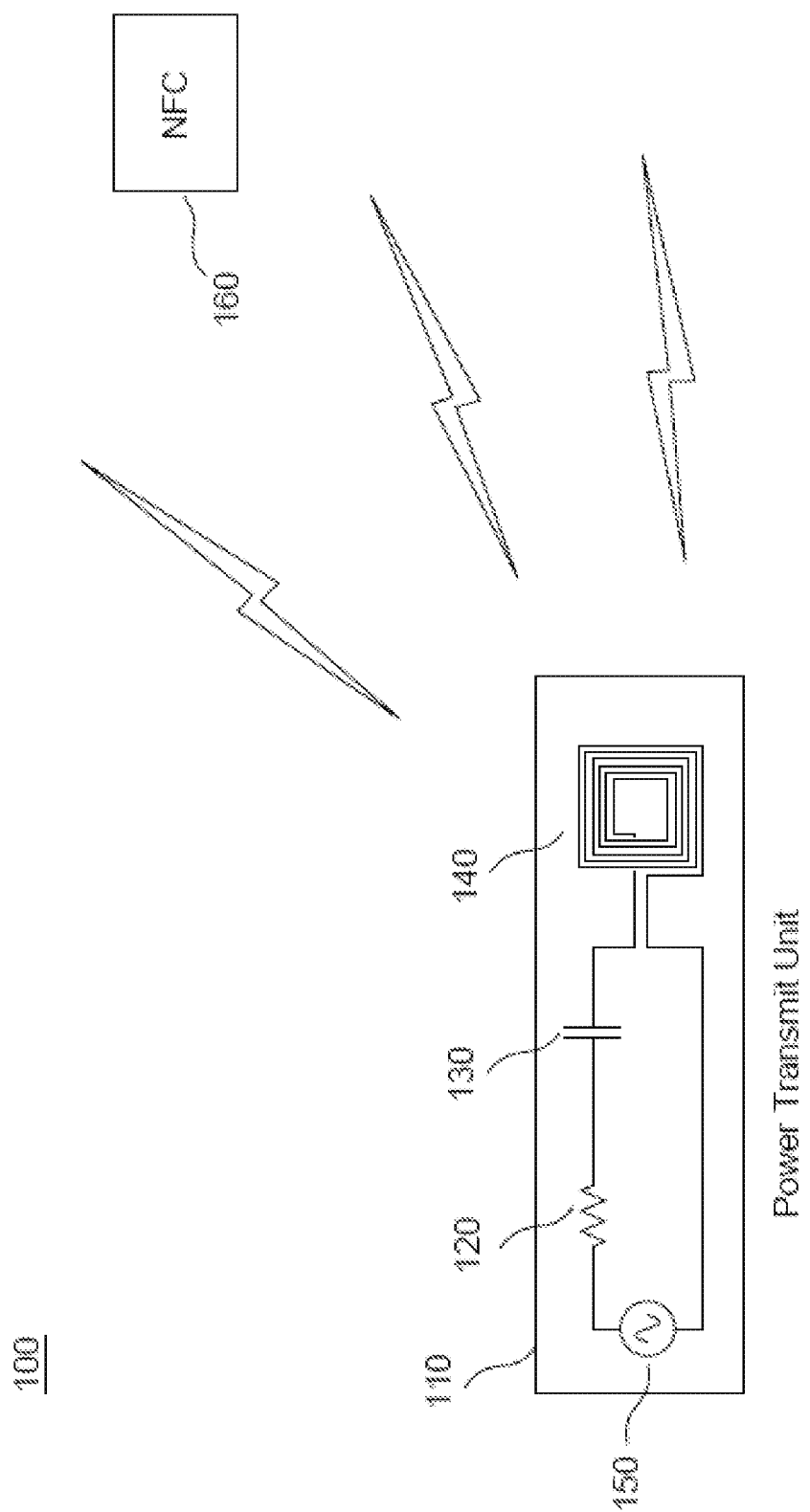
FIG. 1 depicts a wireless charging system with a power transmit unit (PTU) actively charging and a Near Field Communications (NFC) device in close proximity in accordance with some embodiments.

FIG. 1 depicts a wireless charging system 100 with a power transmit unit (PTU) 110 actively charging and a Near Field Communications (NFC) 160 device in close proximity in accordance with some embodiments. A device being charged is not shown, but the PTU 110 may be used to provide power to charge a battery for a cell phone, a tablet computer, a laptop computer, a smart watch, or any other such device. In some embodiments, for example, PTU 110 may charge a mobile device such as device 900X of FIG. 9. Some basic elements inside the PTU 110 are shown. The power transmit coil 140 is tuned with a capacitor 130 to the magnetic resonant frequency. The excitation source 150 delivers the charging power, and the resistor 120 models loss in the circuit.

When an NFC device 160 is brought within the near field of an active PTU 110, it is likely that the power transmit coil 140 will magnetically couple with the NFC coil of the NFC device 160. While the NFC coil of the NFC device 160 may not be tuned to the same frequency as the power transmit coil 140, it is still possible that a significant amount of energy will be delivered to the NFC device 160 even though the PTU 110 is attempting to provide power to another device, and not the NFC device 160. Since NFC devices are not necessarily designed to withstand this amount of energy transfer, there exists a risk that the NFC 160 device may overheat or be damaged. Therefore, while actively charging, the PTU 110 may use some way to determine if an NFC device 160 device is introduced into the charge operating volume. In some embodiments, the detection of such an event triggers subsequent steps, which involves the termination of wireless power transmission. Other steps may involve the PTU 110 engaging an NFC reader to query for NFC devices such as the NFC device 160 that are within range, thereby confirming or excluding the presence of an NFC device or tag.

One approach for dealing with this problem is to periodically stop charging and poll for any NFC devices using a built-in NFC reader. This approach induces a penalty in charge time irrespective of whether an NFC tag was placed in close proximity. In some embodiments, on a 6 to 8 hour charge, the polling suspends charging activity for as much as 20 to 30 minutes total over the course of the entire 6 to 8 hour charge. Another approach is to use a capacitive sensor based on the proximity of a person to trigger an NFC query of nearby devices. However, this approach does not trigger on NFC tag characteristics but on the presence of a person. This can lead to an increase in the number of false triggers and increase the overall charging time. Some embodiments described herein may thus include benefits associated with a detection method that is specific to NFC tag characteristics.

Some embodiments, for example, may operate in accordance with Near Field Communication for the ISO/IEC 18000-3 air interface standard (International Organization for Standardization/International Electrotechnical Commission, 18000-3:2010 published November, 2010) which operates at a center frequency at or near 13.56 MHz using amplitude shift keyed (ASK) modulation and can transmit at data rates between 100 and 400 kilobits/second. For this standard, the devices are no more than roughly 10 centimeters (cm) apart. One obvious benefit for this is security (e.g., hostile communication attempts can only be made within a very close proximity.) Another benefit of Near Field Communication is that by operating in the near field, a significant amount of energy transfer is feasible and practical. This allows one of the communicating devices to be passive, relying purely on energy from the transmitter to operate. This allows the passive device to be very small with no internal power source.

NFC communications may involve an initiator and a target. The initiator transmits in the blind and awakens the target if the target is within proximity. The transmission from the initiator usually entails a read or write request. For a read request (the most common), the target activates and responds to the initiator by transmitting a piece of stored data. For a write request, the target activates and stores the data provided by the initiator into non-volatile memory. If the target is passive with no internal power source, then it is charged by the near field energy from the initiator during the initial interrogation and uses that energy to perform the desired function. In this case, the initiator is referred to as an NFC reader and the target is referred to as an NFC tag. NFC tags appear in various forms. For example, smart cards are credit cards/debit cards, as well as other types of cards, in which an NFC tag is embedded into the card. NFC tags are used in some keys for cars and building access. The NFC tag provides information such as identification, security authentication and data storage. Other NFC tags are being developed for various applications such as reading the ingredients of a food item in a grocery store or reading a description of a rock band displayed on a poster. In each case, an NFC tag is embedded into a product or some sort of object, and is available for interrogation by an NFC reader.

In some embodiments, a full NFC device can operate in three different modes of operation: NFC card emulation or NFC tag emulation, NFC reader/writer, and NFC peer-to-peer. NFC card emulation allows an NFC device to emulate an NFC tag or smart card. In some embodiments, for example, an NFC device may be used to provide credit card information to a payment system. The NFC device, although it is active, may emulate the operation of an NFC tag embedded in a credit card. In the NFC reader mode, the NFC device acts as the NFC reader to instigate communication with NFC tags. In this case, the NFC device acting as the NFC reader would charge the NFC tag and interrogate for some type of information. In NFC peer-to-peer mode, two NFC devices equipped to behave as readers can still communicate data and exchange data. A coil of an NFC device, such as NFC 160, may, as described above, receive power from a PTU, such as PTU 110, that may overheat and cause damage to the circuitry that enables an NFC device to perform the functions described above.

Radio Frequency Identification Devices (RFID) operate similarly to the NFC device operations. RFIDs often operate at greater distances, sometimes outside the near field of the RFID reader, and the tags are often active, meaning the tag has and relies on an internal energy source. An example would be an automated bridge toll system. As the vehicle passes through the toll, the RFID tag is interrogated by an RFID reader at the toll. The RFID tag responds with some sort of vehicle identification number indicating to the RFID reader in the toll booth which account should be charged. In some embodiments. NFC 160 may be an RFID tag. The distinction between NFC and RFID is subtle. NFC may be considered as a sub-category of RFID operating at 13.56 MHz.

As discussed above, wireless power charging is another technology that usually relies on near field electromagnetic energy. In various embodiments, wireless power transfer allows devices to be charged by transmission of energy through far field radiation, near field magnetic coupling, near field electric coupling, or magnetic resonant coupling. For magnetic coupling and magnetic resonant coupling, the energy charging unit or power transmit unit (PTU) produces a magnetic field through the electrical excitation of a primary coil which induces an Alternating Current (AC) in a secondary coil located in the power receiving unit. In some embodiments, the AC power transferred is rectified and regulated (possibly including DC-DC conversion) to power or charge the receiving unit. If the transmit coil is tuned to operate at a particular frequency, then this is called near field resonant magnetic coupling. Near field resonant magnetic field coupling further enhances the energy transfer and relaxes some of the spatial orientation restrictions on the relative positioning of the transmit coil and receive coil. The device that is providing the energy is a PTU, such as PTU 110, and the device that is absorbing energy or being charged may be referred to as a power receiver unit (PRU).

Some embodiments may operate according to aspects of wireless charging standards. For example, some embodiments operate with a magnetic resonant charging standard operating at 6.78 MHz with charging distances of up to one meter. For status and control signaling, such embodiments adopt an out-of-band Bluetooth™ Low Energy (BLE) link operating at 2.4 GHz. Initial charging and setup for the devices as well as status updates are handled over the BLE connection. This allows the PTU to adjust how much power is being delivered and to enter into a power saving mode when charging is complete.

Figure 2:
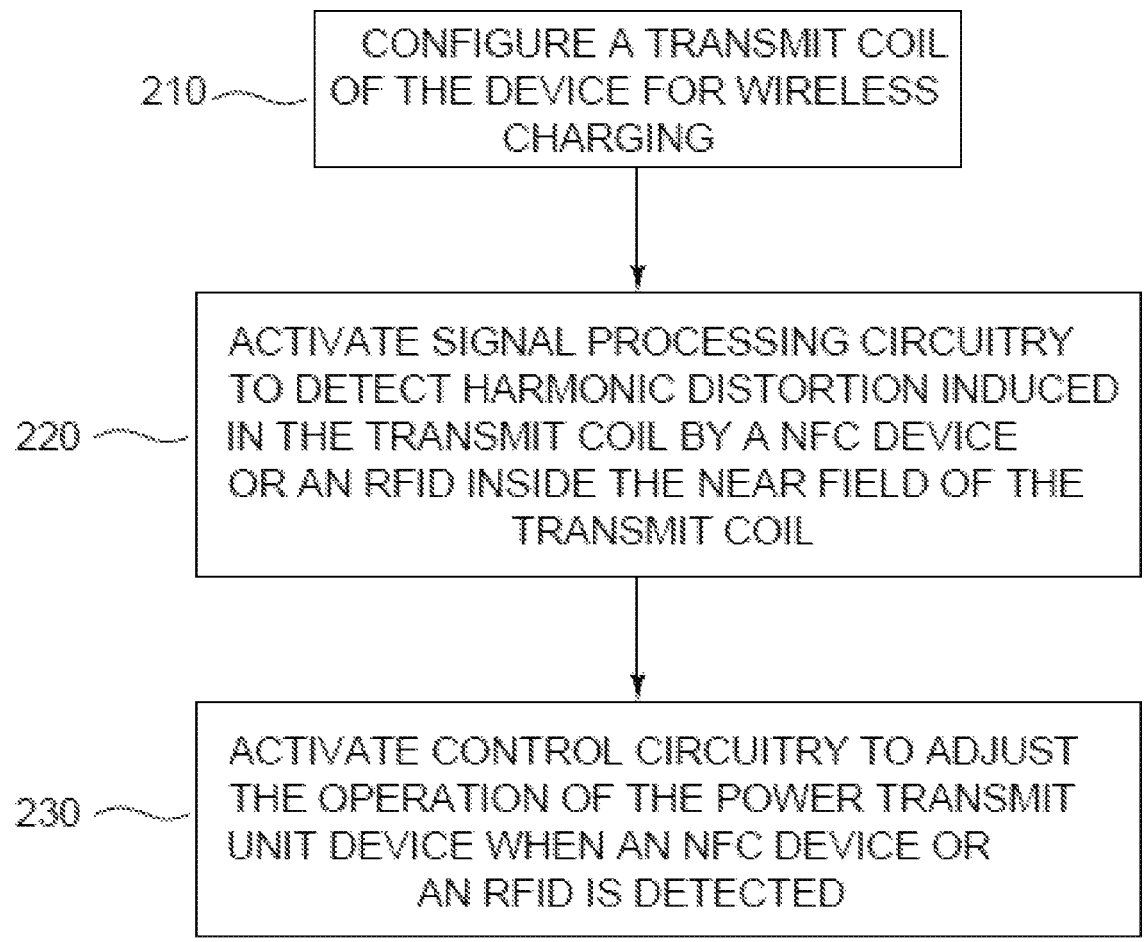
FIG. 2 shows a method described herein to detect for the presence of NFC tags or RFIDs in accordance with some embodiments.

FIG. 2 shows the basic operations described herein to detect for the presence of NFC tags or RFIDs in accordance with some embodiments. In operation 210, a wireless charger or a power transmit unit is configured to charge a power receive unit. For some embodiments, this includes some initial negotiating over a BLE connection: then the transmit coil is excited and charging of the power receive unit commences.

In operation 220, signal processing circuitry is activated to sense the presence of harmonic distortion in the transmit coil. If an NFC tag or RFID is within the near field of the transmit coil, then the NFC tag or RFID will affect the load impedance of the transmit coil. For an NFC device or an RFID device, the loading effect will be non-linear, producing harmonics in the transmit coil.

In operation 230, control circuits are turned on to handle the occurrence of NFC or RFID detection. In one embodiment, the charge operation is halted and an NFC query is instigated. The query is used to confirm the presence of an NFC device, or to determine if the harmonic content is being caused from some other device. Also, some embodiment operate using the query to determine the type of NFC device and if it is an NFC device compatible with the various standards. Depending on the result, the charging be continued, or the charging is halted until the user makes adjustments to the charging configuration. Another possibility is to reduce the power level of the transmit unit device sufficiently enough so as to avoid NFC tag damage. The power level reduction is, in some embodiments, preset. In some embodiments, the power level reduction depends on the actual amplitude of the harmonics detected in the transmit coil.

In some embodiments, the NFC harmonic detection may be reliable enough to forgo the confirmation NFC query as described above and act immediately so as to avoid NFC tag damage.

An NFC tag can be modeled as a parallel resonant tank circuit made up of a coil inductor for transmitting and receiving, an Integrated Circuit (IC) shunt capacitance and a tuning shunt capacitance that tunes the coil to the desired frequency. The tank circuit is also connected to a rectification circuit, which allows the NFC tag to be charged so that it can perform a desired operation. The NFC tank circuit may also have Electrostatic Protection Diodes (ESD) in parallel with the coil inductor. The presence of the ESD diodes and/or a rectification circuit is what creates a non-linear load which induces harmonic distortion in the transmit coil.

Figure 3:
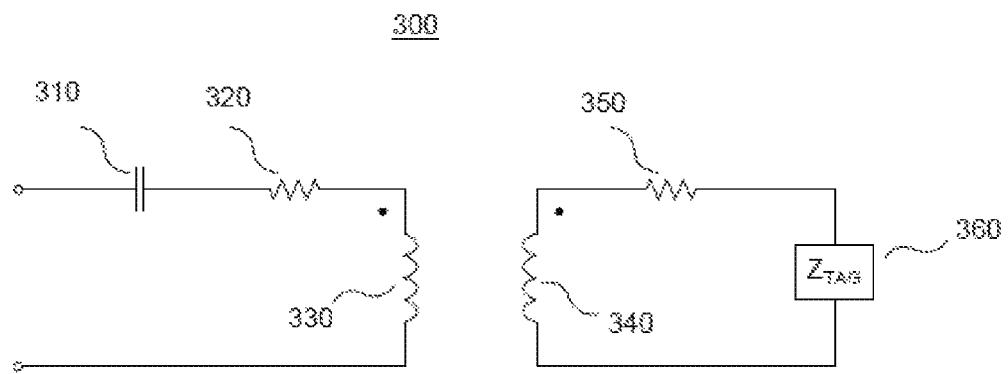
FIG. 3 is one example of a simplified circuit diagram of the driving point impedance of a power transmit unit coil which is magnetically coupled to an NFC device in accordance with some embodiments.

FIG. 3 is one example of a simplified circuit diagram of the driving point impedance of a power transmit unit coil 330 which is magnetically coupled to an NFC device in accordance with some embodiments. The PTU coil 330 is tuned with the capacitor 310 to the magnetic resonant frequency of the charging system. The load impedance 360 in the NFC tag represents the capacitance from a tuning capacitor and parasitic capacitance presented by other integrated circuits along with any non-linear loading effects that are caused by rectification, ESD diodes or any other non-linear loading. The load impedance 360, along with the NFC coil inductor 340, make up the parallel tank circuit in the NFC. The resistors 320 and 350 represent the ohmic losses that are present in each tank circuit. Lastly, the PTU transmit coil 330 and the NFC coil inductor 340 are magnetically coupled by near field coupling.

Figure 4:
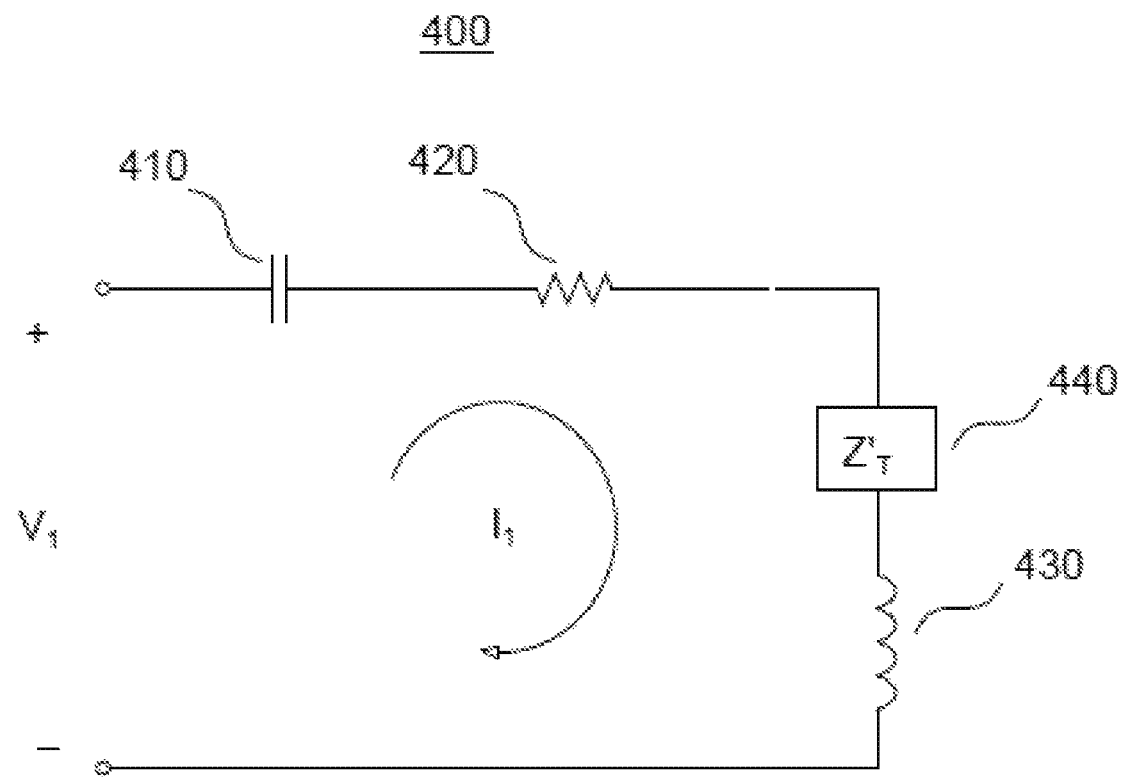
FIG. 4 illustrates one example of an equivalent circuit diagram of the driving point impedance of a power transmit coil with a load impedance that is reflected back to the power transmit coil from the NFC device in accordance with some embodiments.

FIG. 4 illustrates one example of an equivalent circuit diagram 400 of the driving point impedance of a power transmit coil with a load impedance 440 that is reflected back to the power transmit coil 430 from the NFC in accordance with some embodiments. The tuning capacitor 410, the ohmic loss 420, and the transmit coil 430 are all intrinsic to the power transmit unit. The reflected load impedance 440 is shown indicating the loading effect of the NFC device. The voltage across the reflected load impedance 440 is a function of the mutual coupling coefficient M and the current in the NFC coil inductor 340. Since the current in the NFC coil is driven through a non-linear load 360, the reflected load impedance 440 via near field coupling is also non-linear. This results in harmonic content in the power transmit coil 430.

The A4WP standard operates at a charging frequency of 6.78 MHz. The presence of a non-linear load would produce harmonics at 13.56 MHz, 20.34 MHz, 27.12 MHz, 33.9 MHz etc. These harmonics would exist as currents in the PTU tank circuit and in the magnetic fields emanating from the PTU.

Figure 5:
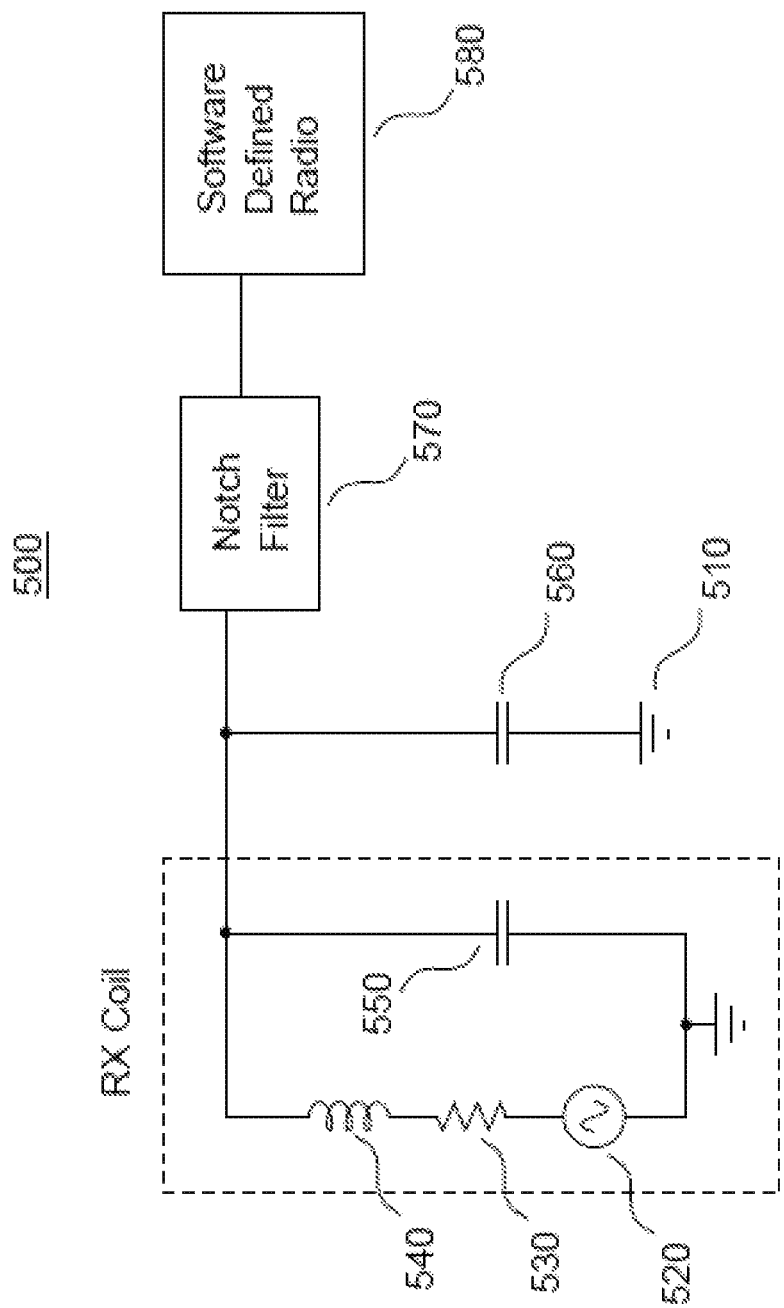
FIG. 5 illustrates a harmonic detector where a sense coil is used to measure the magnetic fields emanating from the power transmit coil in accordance with some embodiments.

FIG. 5 illustrates a harmonic detector 500 where a sense coil 540 is used to measure the magnetic fields emanating from the power transmit coil in accordance with some embodiments. The sense coil 540, in some embodiments, is placed inside the power transmit unit or near enough to sufficiently couple to the power transmit coil. The sense coil 540 is modeled with losses modeled by 530 and a parasitic capacitance modeled by 550. The excitation induced in the sense coil by magnetic coupling to the power transmit coil is indicated by 520. Also included is a tuning capacitor 560, along with a notch filter 570 and a software defined radio 580. The tuning capacitor 560 is used to tune the magnetic resonance frequency to 13.56 MHz.

In this embodiment, a simple radio detector or a software defined radio (e.g., software defined radio 580) is used to constantly measure and compare levels of harmonic content that are induced in the sense coil by the non-linear load. The radio detector is, in some embodiments, implemented as a down conversion mixer followed by a low pass filter. A power detector or a peak detector is, in some embodiments, used to detect the harmonic power, and the down conversion mixer may simply switch frequencies depending on which harmonic was being measured. In a software radio, the power detector or peak detector is, in some embodiments, replaced with an Analog to Digital Converter (ADC). The digital signal may then be processed further with additional filtering and or peak detection. These results may then be correlated with known harmonic signatures for identification purposes. In yet another embodiment, a correlation is performed without peak detection to retain phase information, and specifically detect the relative phase difference between the harmonics.

In another embodiment, the ADC is used immediately after the notch filter and after bandpass filtering to implement a bandpass sampled system. Further detection and processing may then be performed with Digital Signal Processing (DSP) as discussed above.

In the above described embodiments, when an NFC device is brought within proximity, the near field non-linear loading effect would produce harmonics in the transmit coil. If one or more of the harmonic levels increased beyond a certain threshold, the wireless charging would stop and trigger a procedure as described above to confirm the presence of an NFC tag. A more sophisticated form of detection is, in some embodiments, implemented with DSP. In some embodiments, the harmonic signature is correlated with a known set of signatures and trigger depending on the amount of correlation (e.g., the correlation coefficient). This would provide a method to change the detection criteria depending with changing designs, standards, or regulations. In some embodiments, the threshold or trigger is set and updated in firmware and depend on the different harmonics or different combinations of harmonics with different threshold levels. Also, in some embodiments a list of known harmonic signatures for various devices is set and updated in firmware. Lastly, since the fundamental charging frequency will likely dominate the spectral content that is coupled to the sense coil, it is beneficial to introduce a notch filter 570 at the fundamental charge frequency (6.78 MHz). This improves the sensitivity of the harmonic detector and avoids blocking or saturation.

Figure 6:
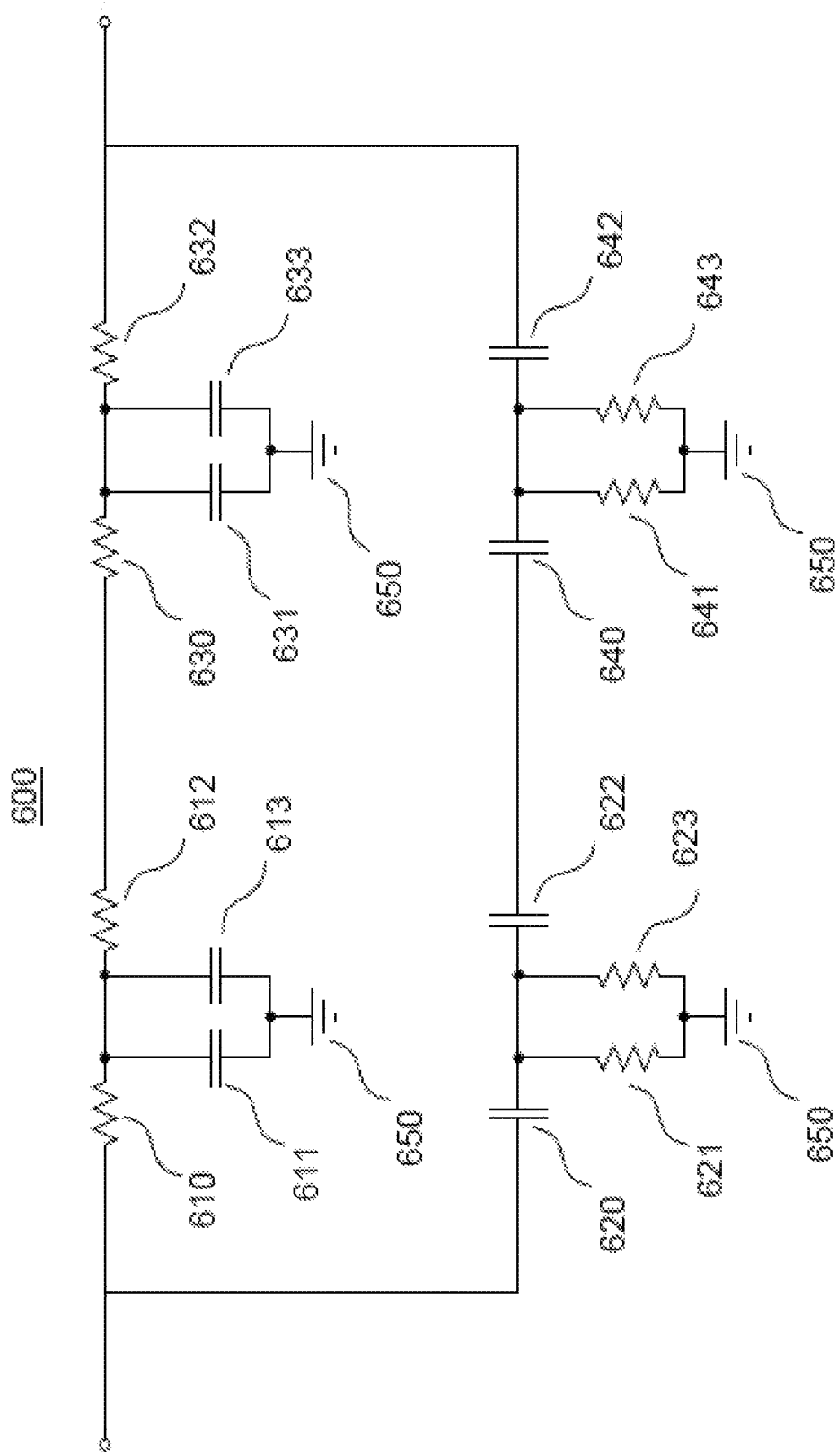
FIG. 6 illustrates one example implementation of a passive notch filter constructed by placing a high pass filter in parallel with a low pass filter for use with some embodiments described herein.

FIG. 6 illustrates one implementation of a passive notch filter 600 constructed by placing a high pass filter in parallel with a low pass filter for use with some embodiments described herein. In other embodiments, other implementations are used. The low pass filter consists of resistors 610, 612, 630 and 632 and capacitors 611, 613, 631 and 633. At low frequency the capacitors are high impedance and the signal is transmitted. At high frequency the capacitors short circuit and the signal is shunted to ground. The high pass filter is made with capacitors 620, 622, 640, and 642 and resistors 612, 623, 641, and 643. At high frequency the capacitors short and transmit the signal through. At low frequency the capacitors are high impedance and the signal is blocked. The sections of the circuit share a common ground. If the corner frequencies of the high pass and the low pass filter are designed correctly, then the filter will pass everything except for a small band of frequencies right between the low pass corner and the high pass corner. This creates the notch in the frequency response.

The RC-CR filter can be implemented with high power handling capability and with inexpensive passive components. The notch filter is, in some embodiments, implemented as a passive LC filter, which may provide a better noise figure. In some embodiments, the notch filter is a tunable notch filter to compensate against tolerance and process variation. Finally, in some embodiments the notch filter is an active notch filter, which may also be implemented in an analog integrated circuit as an analog transconductance capacitance (GM-C) filter or a switched capacitor filter.

Sensitivity can further be improved by reducing the intrinsic harmonic content in the PTU. Intrinsic harmonic content may exist due to non-linearities that are part of the actual power transmit unit and are created in the transmit coil, irrespective of the NFC loading. Additional further harmonic content may be caused by devices or objects other than those within the power transmit unit or the NFC that is being detected. Other sources of harmonic content could include Power Receive Units (PRU), which will contain rectification and other portable electronics, CDs etc. The consequence of additional sources of harmonic content will make reliable detection more difficult. However, there are methods to suppress the intrinsic harmonic content of the device which may restore the sensitivity of the detector to the actual NFC device. Some embodiments include methods that are employed to calibrate to the harmonic distortion within the device so as to detect the change in distortion when an NFC device is introduced into the charge volume.

Figure 7:
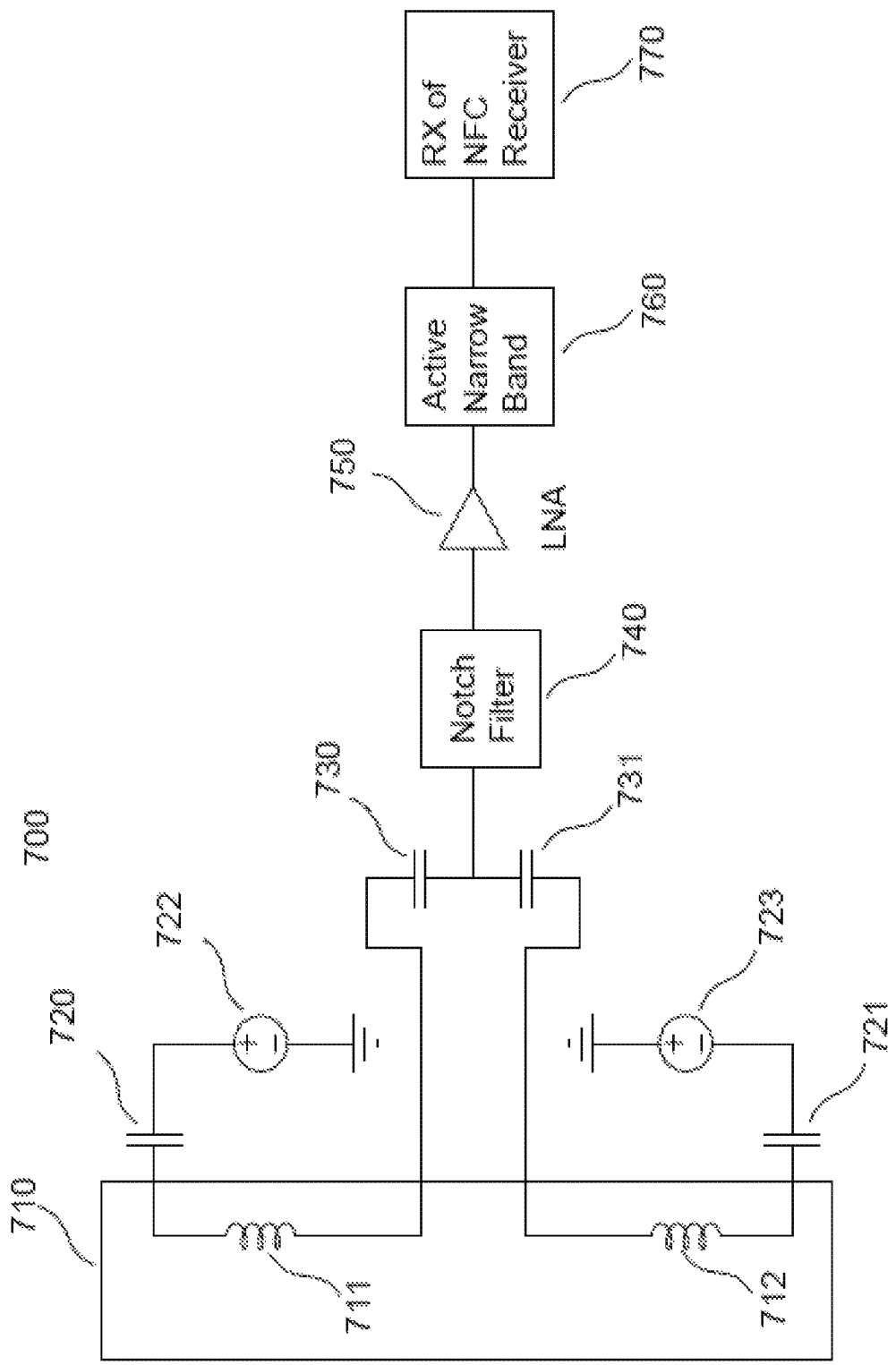
FIG. 7 illustrates an equivalent circuit diagram of a power transmit coil that is capacitively coupled to harmonic detector circuitry in accordance with some embodiments.

FIG. 7 illustrates an equivalent circuit diagram 700 of a power transmit coil 710 that is capacitively coupled to a harmonic detection circuitry in accordance with some embodiments. The harmonics generated by the loading effect of an NFC that are present within the transmit coil 710 are coupled through a capacitive tap. The transmit coil 710 is indicated by 711 and 712 with tuning capacitors 720 and 721. The excitation induced in the coil is modeled by sources 722 and 723. The capacitive tap is created with capacitors 730 and 731. The capacitors 730 and 731 are slightly different values to provide an attenuated voltage from that which appears across the transmit coil 710 (the transmit coil voltage will usually be large). This method is preferred because it provides an attenuated proportional voltage signal while simultaneously tuning the magnetic resonant frequency and also because no additional sense coil is needed.

The capacitive tap is followed by a notch filter 740, an amplifier 750 an active narrowband filter 760 and finally a radio detector 770. The notch filter 740 is used to reject the fundamental charge frequency which may otherwise desensitize and impose stringent dynamic range limitations on the receiver. The low noise amplifier 750 and narrowband filter 760 are preconditioning circuits that aid in the detection of harmonic content. The active narrowband filter 760 may also be tunable to select different harmonic frequencies. In this embodiment, the harmonic detector is implemented as part of an NFC reader that is already built in with the PTU for other purposes. The NFC reader can be slightly altered by changing the local oscillator frequency within the NFC device to detect different harmonic frequencies. This can be accomplished by switching the local oscillator within the NFC to a different crystal or using a frequency multiplier/synthesizer.

The embodiments described herein depend on characteristics that are specific to an NFC device. The embodiments described here can also trigger from a particular set of harmonics or a harmonic signature. The harmonic signature can lend further information to reduce false detections and even to indicate what type of NFC device was in proximity. In some embodiments, a set of pre-recorded harmonic signatures is stored in a harmonic signature data base. The harmonic signature may be defined by the amplitude of the harmonics, the phase characteristics of the harmonics or some combination thereof. Further, in some embodiments, known signatures and detection thresholds requirements are written into a new harmonic signature database and dynamically reprogrammed through a firmware update of the PTU.

Table 1 shows the harmonic content in a PTU transmit coil without an NFC tag present and with an NFC tag present.

TABLE 1

| Harmonic Content Increase with NFC Device | | | | | |
|---|---|---|---|---|---|
| Harmonic | Fund. | 2nd | 3rd | 4th | 5th |
| Freq (MHz) | 6.78 | 13.56 | 20.34 | 27.12 | 33.9 |
| w/O NFC (dBV) | 70 | 9.6 | −28.6 | −14.2 | −6.7 |
| with NFC (dBV) | 69.3 | 8.5 | −7.6 | −15.7 | −1.8 |
| Delta | −0.7 | −1.1 | 21 | −1.5 | 4.9 |

As described above, there is a substantial increase in 3rd and 5th harmonic content in the presence of the NFC device. This is expected as a diode rectification bridge or an ESD protection diode structure produces an odd order non-linear loading effect. Also the power in the fundamental is particularly strong relative to the harmonics, showing the need for a notch filter.

Figure 8:
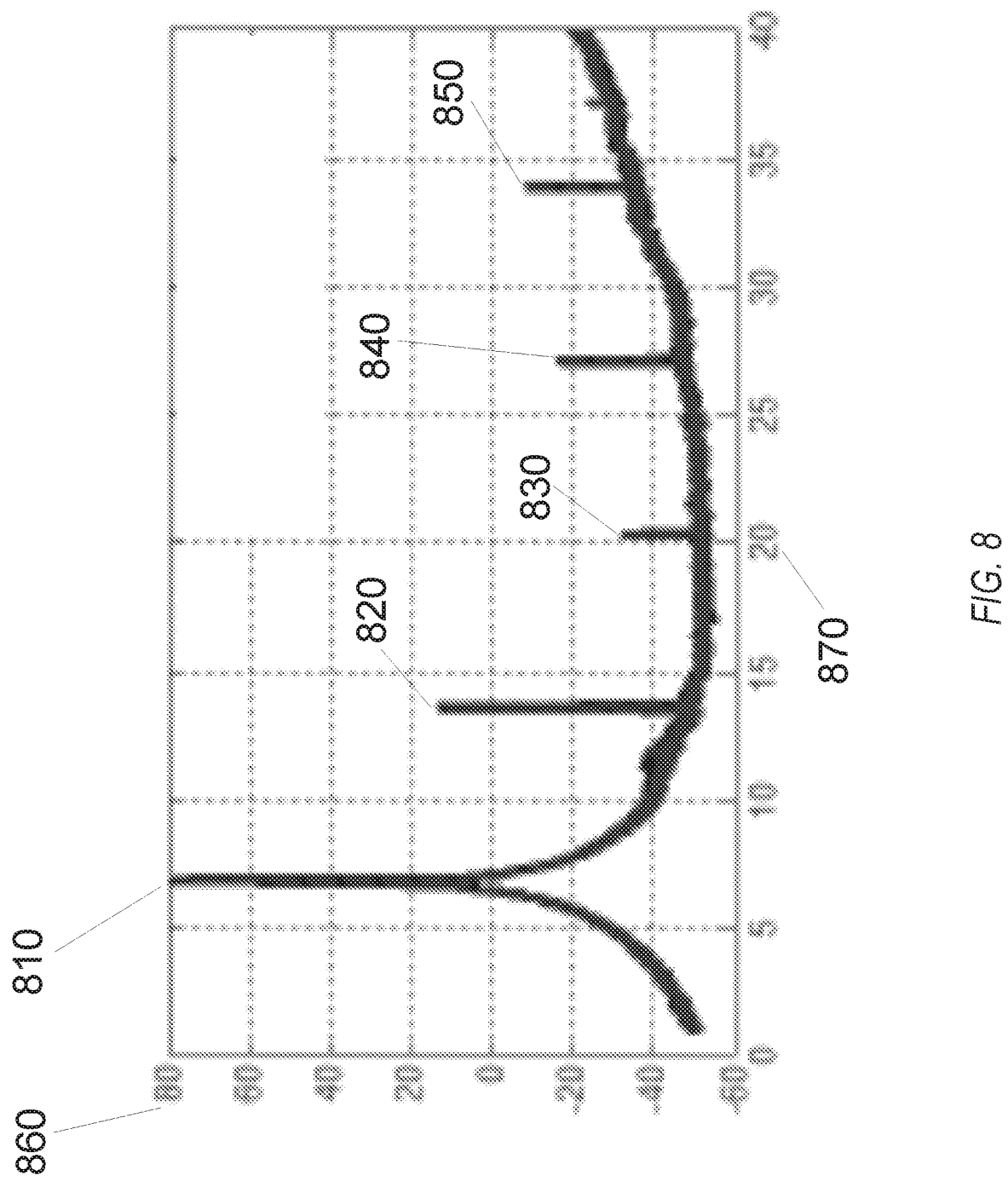
FIG. 8 illustrates a plot of the voltage spectrum in dBV versus frequency in MHz of the current in the transmit coil when loaded by an NFC device within the near field in accordance with some embodiments.

FIG. 8 illustrates a plot of the voltage spectrum in dBV 860 versus frequency in MHz 870 of the current in the transmit coil when loaded by an NFC device within the near field in accordance with some embodiments. The fundamental charge frequency 810 at 6.78 MHz is dominant. The $2^{nd}$ harmonic 820, third harmonic 830, $4^{th}$ harmonic 840 and $5^{th}$ harmonic 850 are also shown. The plot illustrates an example of a harmonic signature. Note that the phase information is not shown although may also serve to distinguish between different types of non-linear loads.

The above described embodiments may be implemented in a variety of different ways. The examples below illustrate various embodiments. It will be apparent that additional embodiments are possible which are not specifically listed below.

Example 1 is a power transmit unit (PTU) device comprising: a transmit coil configured for wireless charging via magnetic resonant coupling; power delivery circuitry coupled to the transmit coil: signal processing circuitry configured to detect harmonic distortion that is induced in the transmit coil by a Near Field Communication (NFC) device inside a near field of the transmit coil; and control circuitry configured to adjust an output power of the power delivery system when triggered by a detection of the NFC device.

In Example 2, the subject matter of Example 1 optionally includes wherein the control circuitry is further configured to adjust the output power of the power delivery system to prevent damage to the NFC device.

In Example 3, the subject matter of any one or more of Examples 1-2 optionally include further comprising: a separate sense coil coupled to the signal processing circuitry, wherein the signal processing circuitry is further configured to detect the harmonic distortion induced in the transmit coil by the separate sense coil.

In Example 4, the subject matter of any one or more of Examples 1-3 optionally include wherein the harmonic distortion induced in the transmit coil by the NFC device inside the near field of the transmit coil induces a voltage or a current in the transmit coil through a direct electromagnetic connection to the transmit coil; and wherein the signal processing circuitry is further configured to detect the harmonic distortion induced in the transmit coil from a signal that is derived from the voltage or a current in the transmit coil through a direct connection to the transmit coil.

In Example 5, the subject matter of Example 4 optionally includes further comprising a capacitive tap connected to the transmit coil, wherein the signal processing circuitry is further configured to detect the harmonic distortion through the capacitive tap that is connected to the transmit coil.

In Example 6, the subject matter of any one or more of Examples 4-5 optionally include wherein the signal processing circuitry comprises a notch filter configured to suppress a fundamental frequency of the PTU device.

In Example 7, the subject matter of any one or more of Examples 4-6 optionally include wherein the signal processing circuitry comprises a tunable down-conversion mixer, a low pass filter and a power detector.

In Example 8, the subject matter of any one or more of Examples 4-7 optionally include wherein the signal processing circuitry comprises an analog to digital converter (ADC) and a digital signal processor configured to perform the harmonic detection.

In Example 9, the subject matter of Example 8 optionally includes further comprising: a memory coupled to the digital signal processor: wherein the digital signal processor is configured to correlate a harmonic signature against a plurality of known harmonic signatures comprised within the harmonic signature data base.

In Example 10, the subject matter of Example 9 optionally includes where in the digital signal processor is configured to detect and distinguish between a plurality of harmonic signatures that are induced by a plurality of devices within the near field of the transmit coil.

In Example 11, the subject matter of any one or more of Examples 9-10 optionally include wherein the digital signal processor is further configured to be reprogrammed with a new harmonic signature data base.

In Example 12, the subject matter of any one or more of Examples 4-11 optionally include wherein the signal processing circuitry is comprising a software defined radio.

In Example 13, the subject matter of Example 12 optionally includes wherein the software defined radio is implemented with a modified NFC reader.

In Example 14, the subject matter of any one or more of Examples 2-13 optionally include wherein upon the detection of the harmonic distortion of the NFC device, the PTU device is configured to stop charging and query for the NFC device with an NFC reader.

In Example 15, the subject matter of any one or more of Examples 2-14 optionally include wherein upon the detection of harmonic distortion of the NFC device, the PTU device is configured to stop charging and generate an alert message.

In Example 16, the subject matter of any one or more of Examples 2-15 optionally include wherein upon the detection of the harmonic distortion of the NFC device, the PTU device is configured to lower the output power output of the power delivery system to reduce the harmonic distortion to less than a specified level.

In Example 17, the subject matter of any one or more of Examples 3-16 optionally include wherein the signal processing circuitry is comprising a tunable down-conversion mixer, a low pass filter and a power detector.

In Example 18, the subject matter of any one or more of Examples 3-17 optionally include wherein the signal processing circuitry is comprising an analog to digital converter (ADC) and a digital signal processor configured to perform the harmonic detection.

Example 19 is a method performed by a power transmit unit (PTU) for detecting a near field communication (NFC) device inside a charge volume, the method comprising: initiating wireless charging by exciting a transmit coil via magnetic resonant coupling: detecting harmonic distortion induced in the transmit coil by the Near Field Communication (NFC) device inside a near field of the transmit coil; and adjusting an output power of the power transmit unit with control circuitry when triggered by a detection of the NFC device.

In Example 20, the subject matter of Example 19 optionally includes wherein adjusting the output power of the power transmit unit ensures that the NFC device is not damaged.

In Example 21, the subject matter of any one or more of Examples 19-20 optionally include wherein detecting the harmonic distortion induced in the transmit coil is performed by signal processing circuitry connected to a separate sense coil.

In Example 22, the subject matter of any one or more of Examples 19-21 optionally include wherein detecting the harmonic distortion induced in the transmit coil is performed by signal processing circuitry using a signal that is derived from a voltage or a current in the transmit coil through a direct connection to the transmit coil.

In Example 23, the subject matter of Example 22 optionally includes wherein the signal processing circuitry suppresses a fundamental frequency of the PTU device with a notch filter.

In Example 24, the subject matter of any one or more of Examples 22-23 optionally include wherein the harmonic detection is performed by: down-converting a harmonic component to baseband using a tunable down-conversion mixer; low pass filtering to remove other harmonic components and noise: and detecting the power of the harmonic component with a power detector.

In Example 25, the subject matter of any one or more of Examples 22-24 optionally include wherein the harmonic detection is performed by: converting the analog signal into a digital signal using an analog to digital converter (ADC); and detecting a harmonic signature using a digital signal processor.

In Example 26, the subject matter of Example 25 optionally includes wherein the harmonic signature is correlated against a plurality of known harmonic signatures comprised within a harmonic signature data base.

In Example 27, the subject matter of Example 26 optionally includes wherein the digital signal processor is updated, the update comprising reprogramming the digital signal processor with a new harmonic signature data base.

Example 28 is a non-transitory computer-readable medium comprising instructions that, when executed by one or more processors of a device comprising a power transmit unit, cause the power transmit unit to: initiate wireless charging with a transmit coil via magnetic resonant coupling; activate a power delivery system that can excite the transmit coil; detect, using signal processing circuitry of the device, harmonic distortion that is induced in the transmit coil by a Near Field Communication (NFC) device inside a near field of the transmit coil; and adjust an output power the power delivery system, using control circuitry of the device, when triggered by a detection of the NFC device.

In Example 29, the subject matter of Example 28 optionally includes wherein the instructions further cause the power transmit unit to adjust the output power of the power delivery system to prevent the NFC device from being damaged by the power transmit unit.

In Example 30, the subject matter of any one or more of Examples 28-29 optionally include wherein the instructions further cause the power transmit unit to detect the harmonic distortion induced in the transmit coil using a separate sense coil connected to the signal processing circuitry.

In Example 31, the subject matter of any one or more of Examples 28-30 optionally include wherein the instructions further cause the power transmit unit to detect the harmonic distortion induced in the transmit coil using a signal that is derived from a voltage or a current in the transmit coil through a direct connection to the transmit coil.

In Example 32, the subject matter of Example 31 optionally includes wherein the instructions further cause the power transmit unit to suppress a fundamental frequency of the PTU device with a notch filter.

In Example 33, the subject matter of any one or more of Examples 31-32 optionally include wherein the instructions further cause the power transmit unit to: down-convert a harmonic component to baseband using a tunable down-conversion mixer; low pass filter to remove other harmonic components and noise; and detect the power of the harmonic component with a power detector.

In Example 34, the subject matter of any one or more of Examples 31-33 optionally include wherein the instructions further cause the power transmit unit to: convert the analog signal into a digital signal using an analog to digital converter (ADC): and detect a harmonic signature using a digital signal processor.

In Example 35, the subject matter of Example 34 optionally includes wherein the instructions further cause the power transmit unit to correlate, using the digital signal processor, against a plurality of known harmonic signatures comprised within a harmonic signature data base.

In Example 36, the subject matter of Example 35 optionally includes wherein the instructions further cause the power transmit unit to reprogram the digital signal processor with a new harmonic signature data base.

Example 37 is a power transmit unit (PTU) device, comprising: means for wireless charging via magnetic resonant coupling through a transmit coil; means for delivering power, using a power delivery system, to the transmit coil; means for detecting harmonic distortion, using signal processing circuitry, that is induced in the transmit coil by a Near Field Communication (NFC) device inside a near field of the transmit coil; and means for adjusting an output power of the power delivery system, using control circuitry, when triggered by a detection of the NFC device.

In Example 38, the subject matter of Example 37 optionally includes further comprising means for adjusting the output power of the power delivery system to ensure that the NFC device is not damaged.

In Example 39, the subject matter of any one or more of Examples 37-38 optionally include further comprising means for detecting the harmonic distortion, using the signal processing circuitry, induced in the transmit coil by a separate sense coil.

In Example 40, the subject matter of any one or more of Examples 37-39 optionally include further comprising means for detecting the harmonic distortion induced in the transmit coil, using the signal processing circuitry, from a signal that is derived from a voltage or a current in the transmit coil through a direct connection to the transmit coil.

In Example 41, the subject matter of Example 40 optionally includes further comprising means for detecting the harmonic distortion induced in the transmit coil, using the signal processing circuitry, through a capacitive tap that is connected to the transmit coil.

In Example 42, the subject matter of any one or more of Examples 40-41 optionally include further comprising means for suppressing a fundamental frequency of the PTU device using a notch filter.

In Example 43, the subject matter of any one or more of Examples 40-42 optionally include further comprising: means for down-converting a harmonic tone using a down-conversion mixer; means for low pass filtering, using a low pass filter, the harmonic tone after the down-conversion mixer; and means for detecting the power at an output of the low pass filter.

In Example 44, the subject matter of any one or more of Examples 40-43 optionally include further comprising: means for converting an analog signal into a digital signal using an analog to digital converter (ADC): and means for digitally processing the digital signal using a digital signal processor to perform the harmonic detection.

In Example 45, the subject matter of Example 44 optionally includes further comprising means for correlating a harmonic signature against a plurality of known harmonic signatures comprised within a harmonic signature data base.

In Example 46, the subject matter of Example 45 optionally includes further comprising the means to detect and distinguish between a plurality of harmonic signatures that are induced by a plurality of devices within the near field of the transmit coil.

In Example 47, the subject matter of any one or more of Examples 45-46 optionally include further comprising means for reprogramming the digital signal processor with a new harmonic signature database with a firmware update.

In Example 48, the subject matter of any one or more of Examples 19-47 structured as instructions on a computer readable medium.

Additionally, any such examples or other embodiments described herein may be implemented using the described elements with other elements or in any other acceptable order that enables low complexity iterative decoding for MU-MIMO systems as described herein.

Figure 9:
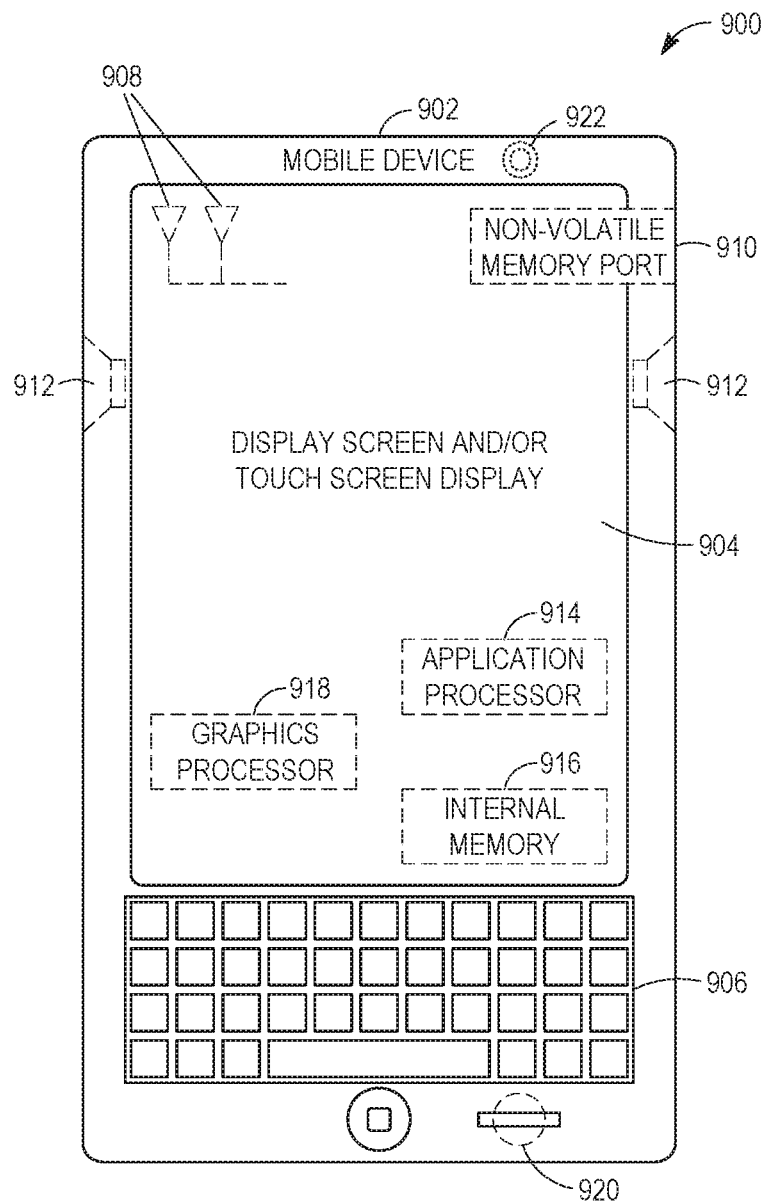
FIG. 9 illustrates an example of a mobile wireless device, which may be a power receiving unit including circuitry to receive and store power from a power transfer unit in accordance with some embodiments herein.

FIG. 9 illustrates an example of a mobile wireless device 900, which may be a power receiving unit including circuitry to receive and store power from a power transfer unit in accordance with some embodiments herein. The device 900 can be any mobile device, a mobile station (MS), a mobile wireless device, a mobile communication device, a tablet, a handset, or other type of mobile wireless computing device. The device 900 can include one or more antennas 908 within housing 902 that are configured to communicate with a hotspot, base station (BS), an evolved Node-B (eNB) for cellular network access, or other type of WLAN or WWAN access point. The device 900 may thus communicate with a WAN such as the Internet via a network, access point, or base station. The device 900 can be configured to communicate using multiple wireless communication standards, including standards selected from 3GPP LTE, WiMAX, High Speed Packet Access (HSPA), Bluetooth, and Wi-Fi standard definitions. The device 900 can communicate using separate antennas 908 for each wireless communication standard or shared antennas 908 for multiple wireless communication standards. The device 900 can communicate in a WLAN, a WPAN, and/or a WWAN.

FIG. 9 also shows a microphone 920 and one or more speakers 912 that can be used for audio input and output from the device 900. A display screen 904 can be a liquid crystal display (LCD) screen, or other type of display screen such as an organic light emitting diode (OLED) display. The display screen 904 can be configured as a touch screen. The touch screen can use capacitive, resistive, or another type of touch screen technology. An application processor 914 and a graphics processor 918 can be coupled to internal memory 916 to provide processing and display capabilities. A non-volatile memory port 910 can also be used to provide data input/output options to a user. The non-volatile memory port 910 can also be used to expand the memory capabilities of the device 900. A keyboard 906 can be integrated with the device 900 or wirelessly connected to the device 900 to provide additional user input. A virtual keyboard 906 can also be provided using the touch screen. A camera 922 located on the front (display screen) side or the rear side of the device 900 can also be integrated into the housing 902 of the device 900.

Figure 10:
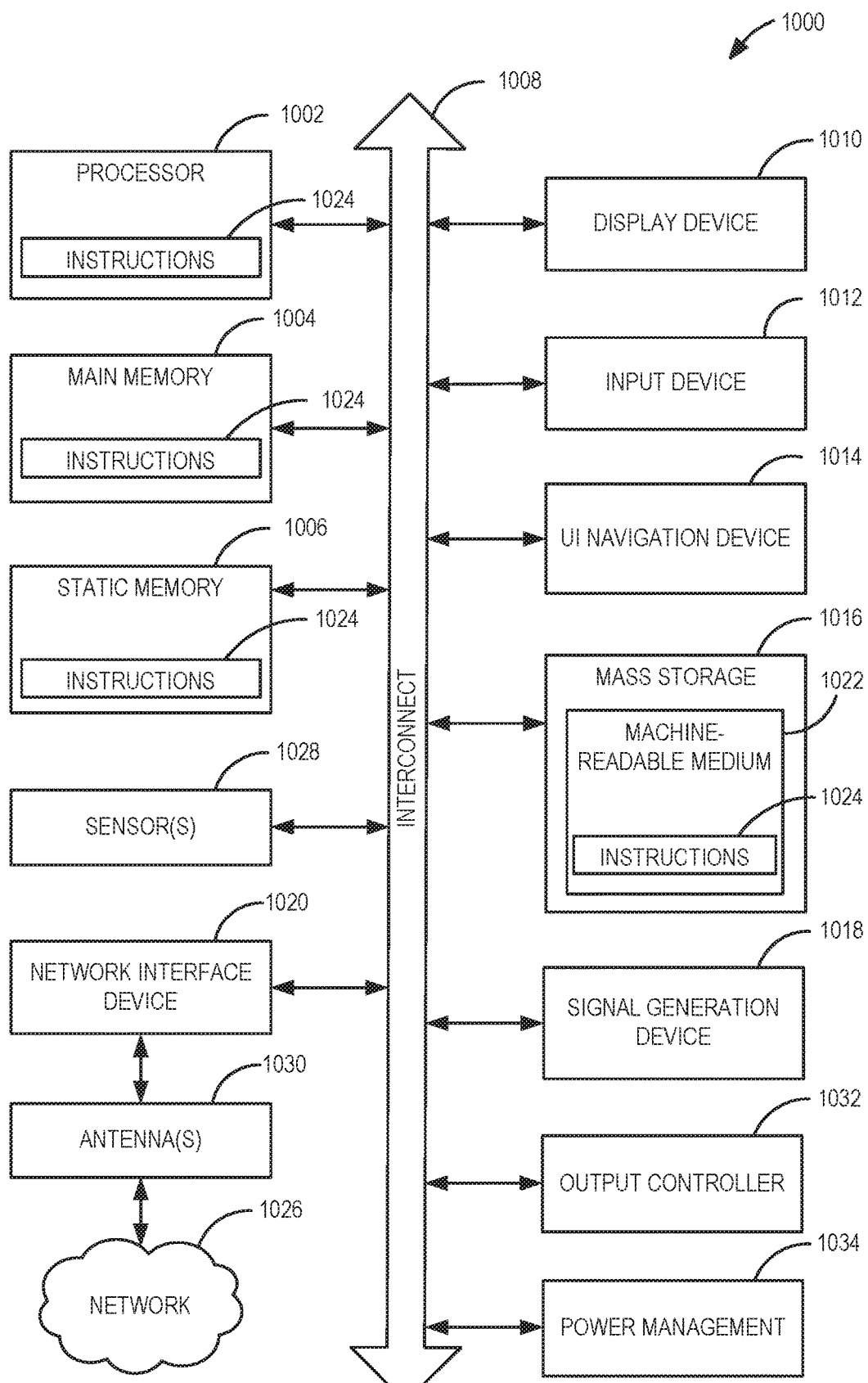
FIG. 10 is a block diagram illustrating an example computer system machine which may be used to implement various devices and methods described herein in accordance with some embodiments.

FIG. 10 is a block diagram illustrating an example computer system machine 1000 which may be used to implement various devices and methods described herein in accordance with some embodiments. Computer system machine 1000 or elements of computer system machine 1000 may be used to implement any device, power transfer unit, power receiving unit, radio frequency identifier (RFID) device, NFC device, or any other such device described herein. In various other embodiments, different device components or multiples of any element may be used in different devices. Some embodiments may include other elements, such as batteries, coils for wireless charging of batteries, or other such elements integrated with any of the elements described herein for machine 1000. In various alternative embodiments, the machine 1000 operates as a standalone device or can be connected (e.g., networked) to other machines. In a networked deployment, the machine 1000 can operate in the capacity of either a server or a client machine in server-client network environments, or it can act as a peer machine in peer-to-peer (or distributed) network environments. The machine 1000 can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine 1000 is illustrated, the term "machine" shall also be taken to include any collection of machines that individually or jointly execute a set (or multiple sets) of instructions to perform any one or more of the methodologies discussed herein.

Example computer system machine 1000 includes a processor 1002 (e.g., a central processing unit (CPU), a graphics processing unit (GPU) or both), a main memory 1004 and a static memory 1006, which communicate with each other via an interconnect 1008 (e.g., a link, a bus, etc.). The computer system machine 1000 can further include a display device 1010, an alphanumeric input device 1012 (e.g., a keyboard), and a user interface (UI) navigation device 1014 (e.g., a mouse). In one embodiment, the display device 1010, input device 1012 and UI navigation device 1014 are a touch screen display. The computer system machine 1000 can additionally include a mass storage device 1016 (e.g., a drive unit), a signal generation device 1018 (e.g., a speaker), an output controller 1032, a power management controller 1034, and a network interface device 1020 (which can include or operably communicate with one or more antennas 1030, transceivers, or other wireless communications hardware), and one or more sensors 1028, such as a Global Positioning Sensor (GPS) sensor, compass, location sensor, accelerometer, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 can also reside, completely or at least partially, within the main memory 1004, static memory 1006, and/or within the processor 1002 during execution thereof by the computer system machine 1000, with the main memory 1004, static memory 1006, and the processor 1002 also constituting machine-readable media.

While the machine-readable medium 1022 is illustrated in an example embodiment to be a single medium, the term "machine-readable medium" can include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions (e.g., instructions 1024) for execution by the machine 1000 and that cause the machine 1000 to perform any one or more of the methodologies of the present disclosure or that is capable of storing, encoding or carrying data structures utilized by or associated with such instructions.

The instructions 1024 can further be transmitted or received over a communications network 1026 using a transmission medium via the network interface device 1020 utilizing any one of a number of well-known transfer protocols (e.g., HTTP). The term "transmission medium" shall be taken to include any intangible medium that is capable of storing, encoding, or carrying instructions (e.g., instructions 1024) for execution by the machine (e.g., machine 1000), and includes digital or analog communications signals or other intangible medium to facilitate communication of such software.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Various embodiments may use 3GPP LTE/LTE-A, IEEE 1002.11, and Bluetooth communication standards. Various alternative embodiments may use a variety of other WWAN. WLAN, and WPAN protocols and standards can be used in connection with the techniques described herein. These standards include, but are not limited to, other standards from 3GPP (e.g., HSPA+, UMTS), IEEE 1002.16 (e.g., 1002.16p), or Bluetooth (e.g., Bluetooth 9.0, or like standards defined by the Bluetooth Special Interest Group) standards families. Other applicable network configurations can be included within the scope of the presently described communication networks. It will be understood that communications on such communication networks can be facilitated using any number of personal area networks, LANs, and WANs, using any combination of wired or wireless transmission mediums.

The embodiments described above can be implemented in one or a combination of hardware, firmware, and software. Various methods or techniques, or certain aspects or portions thereof, can take the form of program code (i.e., instructions) embodied in tangible media, such as flash memory, hard drives, portable storage devices, read-only memory (ROM), random-access memory (RAM), semiconductor memory devices (e.g., Electrically Programmable Read-Only Memory (EPROM), Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

A machine-readable storage medium or other storage device can include any non-transitory mechanism for storing information in a form readable by a machine (e.g., a computer). In the case of program code executing on programmable computers, the computing device can include a processor, a storage medium readable by the processor (including volatile and non-volatile memory and/or storage elements), at least one input device, and at least one output device. One or more programs that can implement or utilize the various techniques described herein can use an application programming interface (API), reusable controls, and the like. Such programs can be implemented in a high level procedural or object-oriented programming language to communicate with a computer system. However, the program(s) can be implemented in assembly or machine language, if desired. In any case, the language can be a compiled or interpreted language, and combined with hardware implementations.

It should be understood that the functional units or capabilities described in this specification have been referred to or labeled as components or modules in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions. Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

What is claimed is:

1. A power transmit unit (PTU) device comprising:
    a memory;
    a transmit coil configured for wireless charging via magnetic resonant coupling;
    power delivery circuitry coupled to the transmit coil;
    signal processing circuitry configured to detect a harmonic distortion that is induced in the transmit coil by a Near Field Communication (NFC) device inside a near field of the transmit coil; and
    control circuitry configured to adjust an output power of the power delivery circuitry when triggered by a detection of the harmonic distortion associated with the NFC device, wherein the NFC device is detected by control circuitry operations to correlate a harmonic signature of the NFC device against a plurality of known harmonic signatures comprised within a harmonic signature database indicating an increase in harmonic content in the presence of the NFC device, and wherein upon the detection of the harmonic distortion of the NFC device, the PTU device is configured to lower the output power of the power delivery circuitry;

wherein the harmonic distortion induced in the transmit coil by the NFC device inside the near field of the transmit coil induces a voltage or a current in the transmit coil through a direct electromagnetic connection to the transmit coil;

wherein the signal processing circuitry is further configured to detect the harmonic distortion induced in the transmit coil from a signal that is derived from the voltage or the current in the transmit coil through a direct connection to the transmit coil;

wherein the signal processing circuitry comprises an analog to digital converter (ADC) and a digital signal processor configured to perform the harmonic detection, and wherein the memory is coupled to the digital signal processor; and wherein the digital signal processor is configured to correlate the harmonic signature against the plurality of known harmonic signatures comprised within the harmonic signature database after the harmonic signature database is dynamically reprogrammed through a firmware update of the PTU device.

2. The device of claim 1 wherein the control circuitry is further configured to adjust the output power of the power delivery circuitry to prevent damage to the NFC device.

3. The device of claim 1 further comprising:
a separate sense coil coupled to the signal processing circuitry, wherein the signal processing circuitry is further configured to detect the harmonic distortion induced in the transmit coil by the separate sense coil.

4. The device of claim 1 further comprising a capacitive tap connected to the transmit coil, wherein the signal processing circuitry is further configured to detect the harmonic distortion through the capacitive tap that is connected to the transmit coil.

5. The device of claim 1, wherein the signal processing circuitry comprises a notch filter configured to suppress a fundamental frequency of the PTU device.

6. The device of claim 1, wherein the signal processing circuitry comprises a tunable down-conversion mixer, a low pass filter and a power detector.

7. The device of claim 1, wherein the digital signal processor is configured to detect and distinguish between a plurality of harmonic signatures that are induced by a plurality of devices within the near field of the transmit coil.

8. The device of claim 1, the digital signal processor is further configured to be reprogrammed with a new harmonic signature data base.

9. The device of claim 1, the signal processing circuitry is comprising a software defined radio.

10. The device of claim 9 wherein the software defined radio is implemented with a modified NFC reader.

11. The device of claim 2 wherein upon the detection of the harmonic distortion of the NFC device, the PTU device is configured to stop charging and query for the NFC device with an NFC reader.

12. The device of claim 2 wherein upon the detection of harmonic distortion of the NFC device, the PTU device is configured to stop charging and generate an alert message.

13. The device of claim 2 wherein the output power of the power delivery system is lowered to reduce the harmonic distortion to less than a specified level.

14. The device of claim 3 wherein the signal processing circuitry is comprising a tunable down-conversion mixer, a low pass filter and a power detector.

15. A method performed by a power transmit unit (PTU) for detecting a near field communication (NFC) device inside a charge volume, the method comprising:
initiating wireless charging by exciting a transmit coil via magnetic resonant coupling;
detecting harmonic distortion induced in the transmit coil by the Near Field Communication (NFC) device inside a near field of the transmit coil; and
lowering an output power of the power transmit unit with control circuitry when triggered by a detection of the NFC device, wherein the NFC device is detected by correlating a harmonic signature of the NFC device against a plurality of known harmonic signatures comprised within a harmonic signature database indicating an increase in harmonic content in the presence of the NFC device;
wherein detecting the harmonic distortion induced in the transmit coil is performed by signal processing circuitry using a signal that is derived from a voltage or a current in the transmit coil through a direct connection to the transmit coil;
wherein the signal processing circuitry is further configured to detect the harmonic distortion induced in the transmit coil from a signal that is derived from the voltage or the current in the transmit coil through a direct connection to the transmit coil;
wherein the signal processing circuitry comprises an analog to digital converter (ADC) and a digital signal processor configured to perform the harmonic detection; and
wherein the digital signal processor is configured to correlate the harmonic signature against the plurality of known harmonic signatures comprised within the harmonic signature database after the harmonic signature database is dynamically reprogrammed through a firmware update of the PTU.

16. The method of claim 15 wherein adjusting the output power of the power transmit unit to prevent damage of the NFC device.

17. The method of claim 15 wherein detecting the harmonic distortion induced in the transmit coil is performed by signal processing circuitry connected to a separate sense coil.

18. The method of claim 15, wherein the harmonic detection is performed by: down-converting a harmonic component to baseband using a tunable down-conversion mixer;
low pass filtering to remove other harmonic components and noise;
detecting the power of the harmonic component with a power detector; and
detecting the harmonic signature using a digital signal processor.

19. A non-transitory computer-readable medium comprising instructions that, when executed by one or more processors of a device comprising a power transmit unit, cause the power transmit unit to:
initiate wireless charging with a transmit coil via magnetic resonant coupling;
activate a power delivery system that can excite the transmit coil;
detect, using signal processing circuitry of the device, harmonic distortion that is induced in the transmit coil by a Near Field Communication (NFC) device inside a near field of the transmit coil, wherein the NFC device is detected by operations to correlate a harmonic signature of the NFC device against a plurality of known harmonic signatures comprised within a harmonic signature database indicating an increase in harmonic content in the presence of the NFC device, and; and lower an output power the power delivery system, using control circuitry of the device, when triggered by a detection of the NFC device;

wherein the NFC device is detected by operations of the one or more processors to correlate the harmonic signature of the NFC device against a plurality of known harmonic signatures comprised within a harmonic signature database based on an indication of an increase in 3rd and 5th harmonic content in the presence of the NFC device; and wherein the increase in the $3^{rd}$ and $5^{th}$ harmonic content is associated with an odd order non-linear loading effect, and a change in the $3^{rd}$ or the $5^{th}$ harmonic content is at least 5 dBV greater than a change in the fundamental, the $2^{nd}$, or the $4^{th}$ harmonic.

20. The non-transitory computer readable medium of claim 19 wherein the instructions further cause the power transmit unit to:
down-convert a harmonic component to baseband using a tunable down-conversion mixer;
low pass filter to remove other harmonic components and noise; and
detect the power of the harmonic component with a power detector.

21. The device of claim 1 wherein the NFC device is detected by control circuitry operations to correlate the harmonic signature of the NFC device against a plurality of known harmonic signatures comprised within a harmonic signature database indicating an increase in 3rd and 5th harmonic content in the presence of the NFC device.

22. The device of claim 21 wherein the increase in the $3^{rd}$ and $5^{th}$ harmonic content is associated with an odd order non-linear loading effect, and a change in the $3^{rd}$ or the $5^{th}$ harmonic content is at least 5 dBV greater than a change in the fundamental, the $2^{nd}$, or the $4^{th}$ harmonic.

23. The method of claim 15 wherein the NFC device is detected by correlating the harmonic signature of the NFC device against a plurality of known harmonic signatures comprised within a harmonic signature database to identify an increase in 3rd and 5th harmonic content in the presence of the NFC device.

24. The method of claim 23 wherein the increase in the $3^{rd}$ and $5^{th}$ harmonic content is associated with an odd order non-linear loading effect, and a change in the $3^{rd}$ or the $5^{th}$ harmonic content is at least 5 dBV greater than a change in the fundamental, the $2^{nd}$, or the $4^{th}$ harmonic.

25. The non-transitory computer readable medium of claim 19, wherein detecting the harmonic distortion induced in the transmit coil is performed by signal processing circuitry using a signal that is derived from a voltage or a current in the transmit coil through a direct connection to the transmit coil; and
wherein the signal processing circuitry is further configured to detect the harmonic distortion induced in the transmit coil from a signal that is derived from the voltage or the current in the transmit coil through a direct connection to the transmit coil.

26. The non-transitory computer readable medium of claim 19, wherein the signal processing circuitry comprises an analog to digital converter (ADC) and a digital signal processor configured to perform the harmonic detection; and
wherein the digital signal processor is configured to correlate the harmonic signature against the plurality of known harmonic signatures comprised within the harmonic signature database after the harmonic signature database is dynamically reprogrammed through a firmware update of the power transmit unit.

* * * * *

UNITED STATES PATENT AND TRADEMARK OFFICE
CERTIFICATE OF CORRECTION

Page 1 of 1

PATENT NO. : 10,771,113 B2
APPLICATION NO. : 15/089125
DATED : September 8, 2020
INVENTOR(S) : Konanur et al.

It is certified that error appears in the above-identified patent and that said Letters Patent is hereby corrected as shown below:

In the Claims

Column 19, Line 6, Claim 19, delete "device, and;" and insert --device;-- therefor Signed and Sealed this
Seventh Day of December, 2021

Drew Hirshfeld
*Performing the Functions and Duties of the
Under Secretary of Commerce for Intellectual Property and
Director of the United States Patent and Trademark Office*